United States Patent [19]

Nagai et al.

[11] Patent Number: 4,891,040
[45] Date of Patent: Jan. 2, 1990

[54] WOVEN FABRIC BELT

[75] Inventors: Takaji Nagai, Kobe; Hiroyuki Okawa, Hyogo; Takahide Mizuno; Fumihito Nakagawa, both of Kobe, all of Japan

[73] Assignee: Mitsuboshi Belting Ltd., Japan

[21] Appl. No.: 221,523

[22] Filed: Jul. 20, 1988

Related U.S. Application Data

[63] Continuation of Ser. No. 510,435, Jul. 1, 1983, abandoned.

[51] Int. Cl.$^4$ ................................. F16G 1/04
[52] U.S. Cl. ..................................... 474/267; 28/156; 139/383 R
[58] Field of Search .................. 474/265–268; 139/426 R, 426 TW, 421, 422, 423; 57/238, 225; 428/257, 258, 259, 231; 198/846

[56] References Cited

U.S. PATENT DOCUMENTS

| | | | |
|---|---|---|---|
| 2,631,463 | 3/1953 | Waugh | 474/265 X |
| 2,656,585 | 10/1953 | Jackson | 28/156 |
| 3,315,328 | 4/1967 | Ibrahim | 28/156 |
| 3,322,163 | 5/1967 | Hughes | 139/383 R |
| 3,455,100 | 9/1967 | Sidles et al. | 57/225 |
| 3,981,206 | 9/1976 | Miranti, Jr. et al. | 474/238 |

FOREIGN PATENT DOCUMENTS

| | | |
|---|---|---|
| 0015718 | 9/1980 | European Pat. Off. . |
| 2161856 | 12/1971 | France . |
| 2452537 | 10/1980 | France . |
| 57-195012 | 11/1982 | Japan . |

Primary Examiner—Thuy M. Bui
Attorney, Agent, or Firm—Wood, Dalton, Phillips Mason & Rowe

[57] ABSTRACT

Woven fabric for use in a power transmission belt. The fabric has a warp of shrinkable yarns obtained by aligning and twisting individual shrinkable mixed twisted yarns. Alternatively, the warp may be formed of more than two mixed twisted yarns mixed in a ratio of greater than 1:15 of elastic yarns formed of polyurethane fibrous yarns oriented at more than 10%, or rubber yarns and other fibrous yarns. The weft is made alternatively of twisted yarns or monofilament yarns. The fabric has excellent shrinkability, wear resistance, and crack resistance.

14 Claims, 3 Drawing Sheets

TWISTED YARN

ELASTIC COVERED
YARN

ELASTIC CORE
YARN

FIG. 6
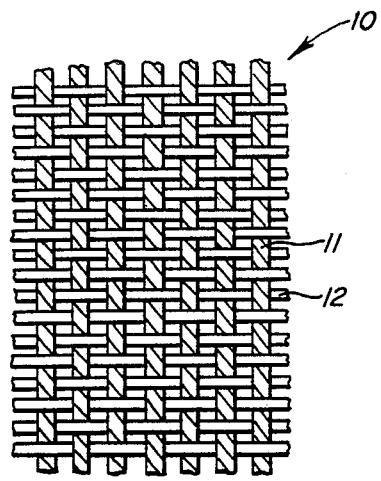
FIG. 7
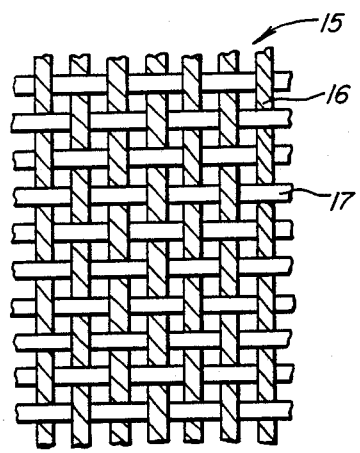
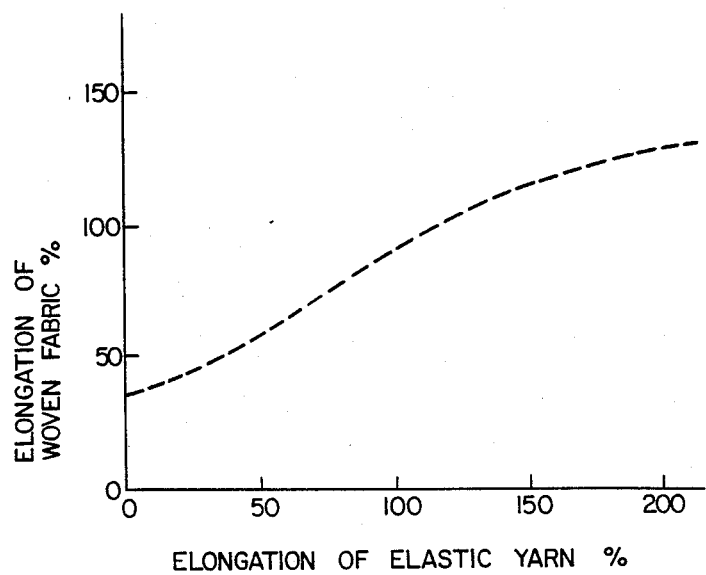
FIG. 8

WOVEN FABRIC BELT

This is a continuation of application Ser. No. 510,435 filed 7-1-83, now abandoned.

TECHNICAL FIELD

This invention relates to woven fabric adapted for use as a tie band of a multi-rib belt. The fabric, which is provided on the surface of the toothed part of a toothed belt has excellent shrinkability, bendability, wear resistance and crack resistance and, provides improved means for coupling the back surfaces of a plurality of V-shaped belts.

BACKGROUND ART

It was heretofore necessary in such belt manufacture to apply tension to elastic yarns, twist and mix the yarns with other fibers, while maintaining the elastic yarns in the elongated state, and twist and mix the mixed yarns, as shown in FIG. 1, so as to obtain a woven fabric having high elongation as a result of the crimp.

However, the elongation of the elastic yarn has the undesirable tendency to include more than approximately 20 times of the other fibrous yarn. When the yarn is twisted in the conventional manner, the elastic yarn is wound on the periphery of the fibrous yarn to produce an elastic cover yarn, as shown in FIG. 3. Alternatively, fibrous yarn is wound on the periphery of the elastic yarn, as shown in FIG. 4 to produce an elastic yarn. The elastic cover yarn has the disadvantages of lack of elongation and elasticity, while the elastic core yarn has the disadvantages of low elongation and lack of wear resistance. Another conventional prior art twisted yarn comprises mixing the yarns by a twisting method causing them to be partly formed in a wavy or loop shape to thereby produce a ring yarn or a loop yarn. This method, however, causes variation in the thickness of the fabric made of these yarns. When this fabric is provided on the surface of the toothed belt part, the pitch line difference, PLD, (the spacing between the center line of the tensile yarn and the root of the valley between the tooth) is irregular. Such ring yarn has a g/d characteristic of 0.1 to 0.2 g/d according to the rigidity and twisting factor of the fiber in the case of ordinary twisting, and 0.5 in case of strongly twisted yarn, and tends to become such an irregular ring yarn as a result of variable tension applied in the forming of the twisted yarn.

DISCLOSURE OF INVENTION

The present invention comprehends the provision of an improved woven fabric for use in a belt manufacture which eliminates the aforementioned drawbacks and disadvantages of the prior art fabrics.

The invention comprehends providing a belt fabric formed of an elastic yarn and other fibrous yarn mixed and twisted at a predetermined ratio to form a shrinkable yarn, which is then used in a belt fabric having improved shrinkability, wear resistance, and crack resistance without the disadvantages of the belt fabrics formed of the elastic cover yarns, the elastic core yarns, and the ring yarns of the prior art.

BRIEF DESCRIPTION OF THE DRAWING

Other features and advantages of the invention will be apparent from the following description taken in connection with the accompanying drawing wherein:

FIG. 6 is a fragmentary plan of woven fabric for a belt embodying the present invention;

FIG. 7 is a fragmentary plan of another woven fabric for the belt embodying the invention; and FIG. 8 is a graph showing the relationship between the elongation of the elastic yarn and the elongation of the fabric formed therefrom.

BEST MODE FOR CARRYING OUT THE INVENTION

Figure 1:
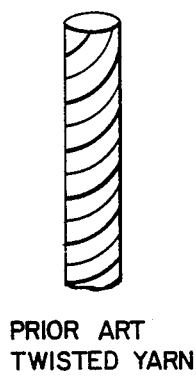
FIG. 1 is a fragmentary elevation showing a prior art twisted elastic yarn.
Figure 2:
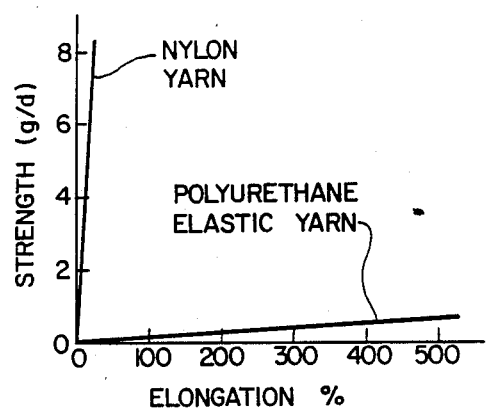
FIG. 2 is a graph showing the relationship between the elongation and the strength of elastic and fibrous yarns.
Figure 3:
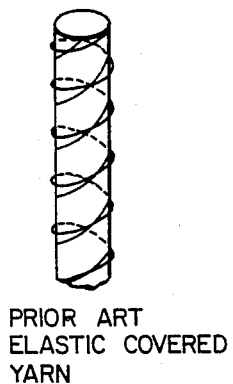
FIG. 3 is a fragmentary elevation showing the twisted state of the elastic yarn.
Figure 4:
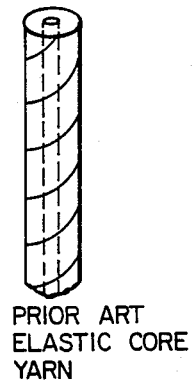
FIG. 4 is a fragmentary elevation showing the twisted state of the fibrous yarn.
Figure 5:
FIG. 5 is a fragmentary elevation of yarn of the present invention.

In the illustrative embodiment of the invention as disclosed in FIG. 6 of the drawing, a woven fabric 10 embodying the invention employs warps 11 and wefts 12 embodying the present invention. As shown in FIG. 5, the warp yarn 11 comprises an elastic yarn formed of a rubber yarn or polyurethane fibrous yarn 13 elongated more than 10%, and a fibrous or cotton spun yarn 14 selected from the group consisting of a filament yarn, or a spun yarn made of nylon, polyester, vinylon, rayon, or aromatic polyamide. Yarn 13 is mixed with yarn 14 in a ratio of 1:15, and the mixed yarns are twisted, thereby forming a shrinkable mixed twisted yarn 11. The mixed yarns are twisted while orienting the yarns by applying more than 10% tension, such as by retarding the feeding of yarn 13. When the tension is less than 10%, the mixed yarn is relatively weak, and when the ratio of yarn 13 to the fibrous yarn 14 is less than 1:15, yarn 13 becomes excessively fine, and tends to become a core yarn, preventing sufficient shrinkability. Accordingly, it is preferred that yarns 13 and 14 be mixed in a ratio of 1:15 or greater.

The mixing ratio of the elastic yarn to the fibrous yarn is correlated with the denier of the elastic yarn in the elongated state. The denier of the elastic yarn in the elongated state is less that 1:15.

FIG. 6 shows an example of the woven fabric 10 for a belt employing the shrinkable mixed twisted yarn 11. Yarn 11 is used as the warp yarn only, and the weft yarns 12 are made of twisted yarns similar to the fibrous yarn 14 of the mixed twisted yarn 11, i.e., blended yarn or mixed twisted yarn blended with more than two types of nylon, polyester, vinylon, rayon, aromatic polyamide, and cotton, or monofilament yarn, such as of nylon or polyester. Fabric 10 may be woven as a plain weave fabric, a twill fabric, or a satin fabric, as desired.

In this manner, a shrinkable cloth 10 embodying the invention is obtained by weaving warps 11 obtained by mixing and twisting a predetermined high ratio of yarns 13 and 14, and wefts 12 obtained by weaving blended yarn or mixed twisted yarn of various type fibers.

The above described belt fabric employs twisted yarns 14 as the wefts 12 of the fabric. However, when the wefts further include monofilaments made of nylon or polyester, as described above, the rigidity of the wefts is enhanced, and the weaving density of the wefts can be reduced, thereby to increase the weaving crimp of the warp yarns 11.

Further, as the warps 11 and the wefts 12 are crossed even if the shrinkable yarns 11 are employed, the degree of freedom of deformation of the yarns 11 is reduced due to the properties of the wefts, causing undesirable loss of shrinkability. As shown in FIG. 8, when the yarns 13 in yarn 11 are not elongated at more than 10%, the desired shrinkability of the woven fabric is not achieved. In order to increase the shrinkability of the fabric, the elongation of the elastic yarn may be raised, as shown in FIG. 8.

However, where the fabric has more than 50% elongation, the stability of the structure of the mixed twisted yarns and the fabric deteriorates and the fabric is unsatisfactory for belt use. More particularly, this results when the elastic yarns 13 and the fibrous yarns 14 are mixed and twisted so as to employ as warps 11 of the fabric 10, only mixed twisted yarns. When more than two of the warp yarns 11 are aligned and are lang twisted (in the same direction in both upward and downward twists) or are variously twisted (in reverse direction in upward and downward twists) to produce mixed and twisted yarn as warp yarns, and the weft yarns 12 are composed of blended yarns, mixed twisted yarns, or monofilament yarns similar to the solely mixed twisted yarns of the warp, the aforementioned deficiencies are eliminated in the shrinkable fabric.

Belt fabric 10 normally employs a plain weave fabric. However, a twill or satin fabric may be alternatively used to provide improved useful life and shrinkability. In the case of a plain weave fabric, sole mixed twisted yarns mixed with the elastic yarn and the fibrous yarn, or more than two mixed and twisted aligned yarns may be lang twisted or variously twisted to produce the warps of the shrinkable yarn. Thus, the warps and wefts are elevationally alternately laminated differentially, thereby forming continuous wave crossing points of the warps and wefts in the warp and weft directions. In the twill or satin fabric, the warps and wefts form crossing points in the waveform at every several yarns in the structure of the fabric, thereby providing less wavy crossing points than in the ordinary plain cloth. When this fabric is used in a belt, rubber is normally coated, frictioned, or pasted on the fabric. Accordingly, the rubber is sufficiently impregnated not only in the spaces between the yarns of the fabric, but at the crossing points, thereby avoiding direct contact of the warp and weft yarns when the belt is flexed, thereby remarkably improving the useful life of the belt.

The above description relates to a belt fabric 10 employing elastic yarns only for the warps. A belt fabric 15 employing the elastic yarns for both the warp and weft yarns embodying the invention is illustrated in FIG. 7.

As shown in FIG. 7, fabric 15 includes warp yarn 16 and weft yarn 17. Warp yarn 16 and weft yarn 17 are constructed in the same manner as the warp yarns 11 of fabric 10. More particularly, the shrinkable mixed twisted yarns are mixed in a ratio greater than 1:15 to the elastic yarns/fibrous yarns. Alternatively, more than two of the mixed twisted yarns 11 are lang twisted or variously twisted to produce the shrinkable yarns with the elastic yarns 13 made of polyurethane fibrous yarn or rubber yarn oriented more than 10% and the fibrous yarns 14 selected from filament yarns and the spun yarns made of nylon, polyester, vinylon, rayon, or aromatic polyamide (as in FIG. 5), and belt fabric 15 may be plain, twill or satin woven fabric.

In this manner, the warp and weft yarns, which both comprise elastic yarns, are woven to form the fabric 15, thereby providing a belt fabric which has desired shrinkability in both warp and weft directions and, thus, is advantageously adapted for use as a tie band of a multi-rib belt.

Examples of fabrics for a belt according to the present invention as described above are as follows.

EXAMPLE

Warps produced by twisting polyurethane fibrous yarns and twisted nylon filament yarns at ratios of 1:4 and 1:8 (the denier ratio at the time of twisting), and wefts produced by twisted nylon filament yarns were woven to produce a woven belt fabric in accordance with the present invention, as shown in Table I. The physical properties of the fabrics are compared with those of conventional belt cloth in Table II.

TABLE I

| | Conventional Cloth | | EMBODIMENT 1 Polyurethane elastic Yarn Elongation 100% | | EMBODIMENT 2 Polyurethane elastic Yarn Elongation 100% | |
| --- | --- | --- | --- | --- | --- | --- |
| | Warp | Weft | Warp | Weft | Warp | Weft |
| Type Yarns Yarns | nylon filament twisted yarn | nylon filament twisted yarn | polyurethane elastic yarn + nylon filament twisted yarn | nylon filament twisted yarn | Polyurethane elastic yarn + nylon filament yarn | nylon filament twisted yarn |
| Structure of Cloth | $N_{849^{D/1}} \times N_{840^{D/1}}$ 60 × 40/5 cm | | $U_{(105 + 420^D)/1} \times 2 \times N_{840^{D/1}}$ $\alpha 40/5$ cm | | N 60 40/5 cm | |

In Table I, U represents urethane fiber yarn, and N represents nylon filament twisted yarn.

TABLE II

| | Conventional Cloth | Cloth of First Embodiment | Cloth of Second Embodiment |
| --- | --- | --- | --- |
| Strength (kg/cm$^2$) | 227 | 220 | 224 |
| Elongation (%) | 34 | 73 | 53 |

As shown in Tables I and II, the belt fabric of the present invention employing polyurethane elastic yarns having shrinkability in the warps of the fabric and fibrous yarns in mixed and twisted state, has 1.3 to 2.2 times the elongation of the conventional cloth woven only with conventional twisted nylon filament yarns, as well as excellent shrinkability.

According to the present invention as described above, the woven belt fabric is composed of warps obtained by aligning sole shrinkable mixed twisted yarns mixed in a ratio greater than 1:15 of the elastic yarns relative to the fibrous yarns oriented with a predetermined tension or more than two mixed twisted yarns, lang twisting or variously twisting them as shrinkable yarns, and wefts made of twisted yarns, monofilament yarns of various type fibers. Alternatively, the shrinkable yarns may be used as both the warps and the wefts, thereby eliminating the problems of the conventional covered yarn, core yarn and ring yarn, providing adequate cutting elongation and shrinkability, improved shrinkability, wear resistance and crack resistance, and uniform PLD of the toothed belt.

Figure 9:
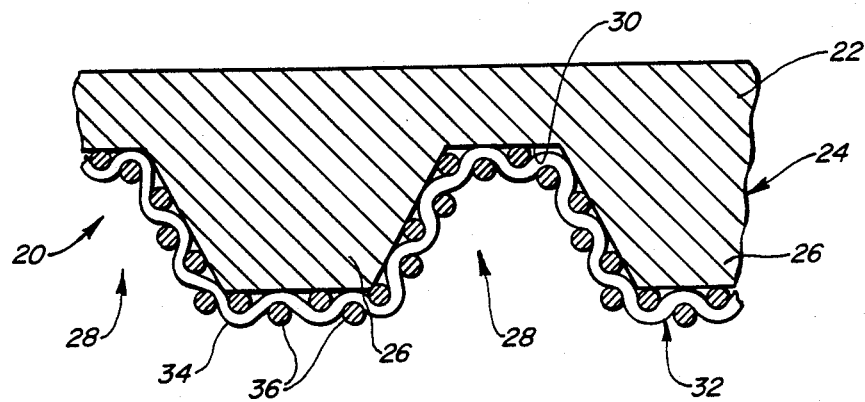
FIG. 9 is a cross sectional partially cutaway schematic view of a power transmission belt, including a woven belt fabric, embodying the present invention.

Referring to FIG. 9, there is illustrated a power transmission belt 20 including a woven belt fabric, according to the present invention. The power transmission belt 20 is of conventional construction and includes a continuous load carrying rubber section 22. A rubber toothed section 24 comprises a plurality of longitudinally spaced teeth 26 defining grooves 28 therebetween. The toothed section 24 defines a toothed surface 30. Provided on the toothed surface 30 is a woven belt fabric 32. The woven belt fabric 32 includes warps 34 and wefts 36. Specifically, the fabric 32 may comprise the woven fabric as described hereinabove relative to FIGS. 6 or 7 utilizing the yarn illustrated in FIG. 5.

The foregoing disclosure of specific embodiments is illustrative of the broad inventive concepts comprehended by the invention.

We claim:

1. A power transmission belt comprising:
   a load carrying rubber section;
   a tooth rubber section on said load carrying section defining a toothed surface; and
   a woven belt fabric on said toothed surface including
      warps of shrinkable yarns obtained by aligning and twisting sole shrinkable mixed twisted yarns including elastic yarn elongated more than 10% and comprising more than approximately 1/15 of said Yarns, and
      wefts made of twisted yarns.

2. A power transmission belt comprising:
   a load carrying rubber section;
   a tooth rubber section on said load carrying section defining a toothed surface; and
   a woven belt fabric on said toothed surface including
      warps of shrinkable yarns obtained by aligning and twisting more than two mixed twisted yarns mixed at a ratio of greater than 1:15 of elastic yarns made of polyurethane fibrous yarns oriented at a tension of more than 10% and other fibrous yarns, and
      wefts made of twisted yarns.

3. A power transmission belt comprising:
   a load carrying rubber section;
   a tooth rubber section on said load carrying section defining a toothed surface; and
   a woven belt fabric on said toothed surface including
      warps of shrinkable yarns obtained by aligning and twisting more than two mixed twisted yarns mixed at a ratio of greater than 1:15 of rubber yarns and other fibrous yarns, and
      wefts made of twisted yarns.

4. A power transmission belt comprising:
   a load carrying rubber section;
   a tooth rubber section on said load carrying section defining a toothed surface; and
   a woven belt fabric on said toothed surface including
      warps of shrinkable yarns obtained by aligning and twisting sole shrinkable mixed twisted yarns including an elastic yarn elongated more than 10% and comprising more than approximately 1/15 of said warp yarns, amd
      wefts made of monofilament yarns.

5. A power transmission belt comprising:
   a load carrying rubber section;
   a tooth rubber section on said load carrying section defining a toothed surface; and
   a woven belt fabric on said toothed surface including
      warps of shrinkable yarns obtained by aligning and twisting more than two mixed twisted yarns mixed at a ratio of greater than 1:15 of elastic yarns made of polyurethane fibrous yarns oriented at a tension of more than 10% and other fibrous yarns, and
      wefts made of monofilament yarns.

6. A power transmission belt comprising:
   a load carrying rubber section;
   a tooth rubber section on said load carrying section defining a toothed surface; and
   a woven belt fabric on said toothed surface including
      warps of shrinkable yarns obtained by aligning and twisting more than two mixed twisted yarns mixed at a ratio of greater than 1:15 of rubber yarns and other fibrous yarns, and
      wefts made of monofilament yarns.

7. The woven belt fabric of claims 1, 2, 3, 4, 5 or 6 wherein said fabric comprises a fabric selected from the group consisting of plain, twill and satin fabrics.

8. The woven belt fabric of claims 2, 3 5 or 6 wherein said other fibrous yarn of said warp is formed of a yarn selected from the group consisting of filament yarn, and spun yarn made of a synthetic resin selected from the group of synthetic resins consisting of nylon, polyester, vinylon, rayon, and aromatic polyamide.

9. The woven belt fabric of claims 2, 3, 5 or 6 wherein the other fibrous yarn of said warp is made of crimped spun yarn.

10. The woven belt fabric of claims 1, 2 or 3 wherein the twisted yarn of said weft is a twisted yarn selected from the group consisting of blended yarn, or mixed twisted yarn made of a material selected from the group consisting of nylon, polyester, vinylon, rayon, aromatic polyamide and cotton.

11. The woven belt fabric of claims 4, 5 or 6 wherein the monofilament of said weft is a monofilament yarn selected from the group consisting of nylon and polyester.

12. The woven belt fabric of claims 1, 2 or 3 wherein the wefts are formed of shrinkable yarns.

13. The woven belt fabric of claims 1, 2 or 3 wherein the wefts are formed of shrinkable yarns similar to said shrinkable warp yarns.

14. The woven belt fabric of claims 1, 2 or 3 wherein the wefts are formed of shrinkable yarns and wherein said fabric comprises a fabric selected from the group consisting of plain, twill and satin fabrics.

* * * * *